(12) United States Patent
Behrens et al.

(10) Patent No.: US 9,699,021 B2
(45) Date of Patent: Jul. 4, 2017

(54) RING PROTECTION STATE AWARE BANDWIDTH ADAPTATION

(75) Inventors: Stefan Behrens, Herzogenrath (DE); Jüergen Bos, Köln (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 353 days.

(21) Appl. No.: 14/359,458

(22) PCT Filed: Nov. 21, 2011

(86) PCT No.: PCT/EP2011/070596
§ 371 (c)(1),
(2), (4) Date: May 20, 2014

(87) PCT Pub. No.: WO2013/075734
PCT Pub. Date: May 30, 2013

(65) Prior Publication Data
US 2014/0293774 A1    Oct. 2, 2014

(51) Int. Cl.
*H04L 12/24*    (2006.01)
*H04L 12/437*   (2006.01)
(Continued)

(52) U.S. Cl.
CPC ........ *H04L 41/0654* (2013.01); *H04L 12/437* (2013.01); *H04L 45/18* (2013.01);
(Continued)

(58) Field of Classification Search
CPC .................................................. H04L 41/0654
See application file for complete search history.

(56) References Cited

U.S. PATENT DOCUMENTS

| 7,599,315 B2 | 10/2009 | Cornet et al. |
| 7,733,810 B2 | 6/2010 | Denecheau et al. |

(Continued)

FOREIGN PATENT DOCUMENTS

| CN | 101232427 A | 7/2008 |
| CN | 101399737 A | 4/2009 |

(Continued)

OTHER PUBLICATIONS

ITU-T G.8032/Y.1344 (Jun. 2008), Ethernet ring protection switching.*
(Continued)

*Primary Examiner* — Charles C Jiang
*Assistant Examiner* — Thad Defauw
(74) *Attorney, Agent, or Firm* — Rothwell, Figg, Ernst & Manbeck, p.c.

(57) ABSTRACT

For performing link adaptation in an Ethernet ring protection system, a link management controller (180) determines a ring protection state of an Ethernet protection ring. Further, the link management controller (180) adapts bandwidth of a link (25) of the Ethernet protection ring. Depending on the adapted bandwidth and the determined ring protection state, the link management controller (180) deactivates the link of the Ethernet protection ring. In particular, if the adapted bandwidth is below a threshold value and the ring protection state indicates that there is no link failure in the Ethernet protection ring, the link management controller (180) may deactivate the link (25).

19 Claims, 9 Drawing Sheets

(51) Int. Cl.
*H04L 12/803* (2013.01)
*H04L 12/705* (2013.01)
*H04L 12/703* (2013.01)
*H04L 12/801* (2013.01)

(52) U.S. Cl.
CPC ............ *H04L 45/28* (2013.01); *H04L 47/125* (2013.01); *H04L 47/14* (2013.01)

(56) References Cited

U.S. PATENT DOCUMENTS

| | | | |
|---|---|---|---|
| 8,345,540 | B2 | 1/2013 | Rollins |
| 8,477,660 | B2 | 7/2013 | Lee et al. |
| 8,570,858 | B2 | 10/2013 | Song |
| 8,670,305 | B2 | 3/2014 | Peng et al. |
| 8,891,535 | B2 | 11/2014 | Angst et al. |
| 2002/0075834 | A1 | 6/2002 | Shah et al. |
| 2004/0146006 | A1* | 7/2004 | Jackson ............ H04L 12/2602 370/230 |
| 2006/0245351 | A1 | 11/2006 | Pande et al. |
| 2007/0111757 | A1* | 5/2007 | Cao .................. H04L 47/14 455/561 |
| 2008/0095047 | A1 | 4/2008 | Skalecki et al. |
| 2008/0239943 | A1 | 10/2008 | Hauenstein et al. |
| 2008/0259784 | A1 | 10/2008 | Allan et al. |
| 2009/0213855 | A1 | 8/2009 | Xu |
| 2009/0265476 | A1 | 10/2009 | Bahls |
| 2010/0054246 | A1 | 3/2010 | Shah et al. |
| 2010/0135154 | A1* | 6/2010 | Cheung ............ H04L 12/4625 370/223 |
| 2010/0214911 | A1* | 8/2010 | Cooke .................... H04L 12/66 370/229 |
| 2011/0200051 | A1* | 8/2011 | Rivaud ................. H04J 3/0641 370/400 |
| 2011/0280242 | A1 | 11/2011 | Kugel et al. |
| 2012/0092983 | A1 | 4/2012 | Song |
| 2012/0120950 | A1 | 5/2012 | Mentze et al. |
| 2013/0258855 | A1* | 10/2013 | Bos ....................... H04L 12/185 370/235 |
| 2014/0269433 | A1 | 9/2014 | Allan et al. |

FOREIGN PATENT DOCUMENTS

| | | |
|---|---|---|
| CN | 101640646 A | 2/2010 |
| EP | 2352253 A1 | 8/2011 |

OTHER PUBLICATIONS

"Media Acess Control (MAC) Bridges", IEEE Standard for Local and Metropolitan Area Networks, 802.1D, Jun. 9, 2004, 281 pages.

"Series G: Transmission Systems and Media, Digital Systems and Networks. Packet Over Transport Aspects—Ethernet Over Transport Aspects. Series Y: Global Information Infrastructure, Internet Protocol Aspects and Next-Generation Networks. Internet Protocol Aspects—Transport. Ethernet Ring Protection Switching", International Telecommunication Union, ITUI-T G.8032/Y.1344, Feb. 2012, 104 pages.

First Office Action issued on Sep. 5, 2016, in Chinese application No. 201180076275.8 with English translation, 16 pages.

* cited by examiner

RING PROTECTION STATE AWARE BANDWIDTH ADAPTATION

CROSS REFERENCE TO RELATED APPLICATION(S)

This application is a 35 U.S.C. §371 National Phase Entry Application from PCT/EP2011/070596 filed Nov. 21, 2011, the disclosure of which is incorporated by reference.

TECHNICAL FIELD

The present invention relates to methods for bandwidth adaptation in an Ethernet ring protection system.

BACKGROUND

Ethernet ring protection (ERP) is a resiliency mechanism in which may be used to fulfill high availability requirements while at the same time guaranteeing loop free topologies in Ethernet networks. ERP may for example be applied in Carrier Ethernet networks when striving at protection switching times which are equivalent to those of conventional Time Division Multiplexing (TDM) networks, i.e., in the range of 50 ms or less. Examples of ERP protocols are ITU-T G.8032, the Spanning Tree Protocol (STP) or STP variants, e.g., the Rapid Spanning Tree Protocol (RSTP) or the Multiple Spanning Tree Protocol (MSTP).

A G.8032 Ethernet protection ring has one ring protection link (RPL) which is blocked in normal operation, thus avoiding loops. In case of a failure of a link or port in the Ethernet protection ring, signal failure (SF) messages are transmitted between ring nodes of the Ethernet protection ring multicast to inform ring nodes maintaining the RPL of the failure condition. These ring nodes may then unblock the RPL, thereby forming a new network topology. Details of the operation of a G.8032 ERP system can be found in ITU-T G.8032 and IEEE 802.1D.

Ethernet networks may be based on various types of link types, including for example microwave links and other types of wireless links. Some of such link types may offer the possibility of bandwidth adaptation. For example, the bandwidth of a microwave link may be adapted by adapting a modulation scheme of the link, enabling microwave nodes to choose the highest order modulation depending on radio conditions. At good radio conditions, with high signal to noise ratios, higher order modulation may be used in order to gain high throughput. Instead of accepting higher bit error rates during times of lower signal to noise ratios, e.g., due to channel fading, a lower order modulation may be used, thereby reducing the bit error rate at the expense of lowering the transmission rate of the link.

Generally, it is also desirable to implement resilience in Ethernet networks which are at least in part based on links offering the possibility of bandwidth adaptation. Accordingly, there is need for techniques which allow for efficiently using bandwidth adaptation in an Ethernet ring protection system.

SUMMARY

According to an embodiment of the invention, a method for link adaptation in an Ethernet ring protection system is provided. According to the method, a link management controller determines a ring protection state of an Ethernet protection ring. Further, the link management controller adapts bandwidth of a link of the Ethernet protection ring. Depending on the adapted bandwidth and the determined ring protection state, the link management controller deactivates the link of the Ethernet protection ring.

According to a further embodiment of the invention, a device for use in an Ethernet ring protection system is provided. The device comprises at least one port for providing a link of an Ethernet protection ring and a link management controller configured to adapt bandwidth of the link. The link management controller is further configured to determine a ring protection state of the Ethernet protection ring and to deactivate the link depending on the adapted bandwidth and the determined ring protection state.

Features and advantages of the above and further embodiments of the invention will be apparent from the following detailed description and the accompanying drawings.

DETAILED DESCRIPTION OF EMBODIMENTS

In the following, the invention will be explained in more detail by referring to exemplary embodiments and to the accompanying drawings. The illustrated embodiments relate to concepts of bandwidth adaptation in an ERP system. In the illustrated examples, it is assumed that the Ethernet ring protection system is based on ITU-T G.8032 and the ERP protocol defined therein. However, it is to be understood that the concepts as described herein could also be applied to other types of ERP protocols, e.g., STP, MSTP or RSTP.

Figure 1:
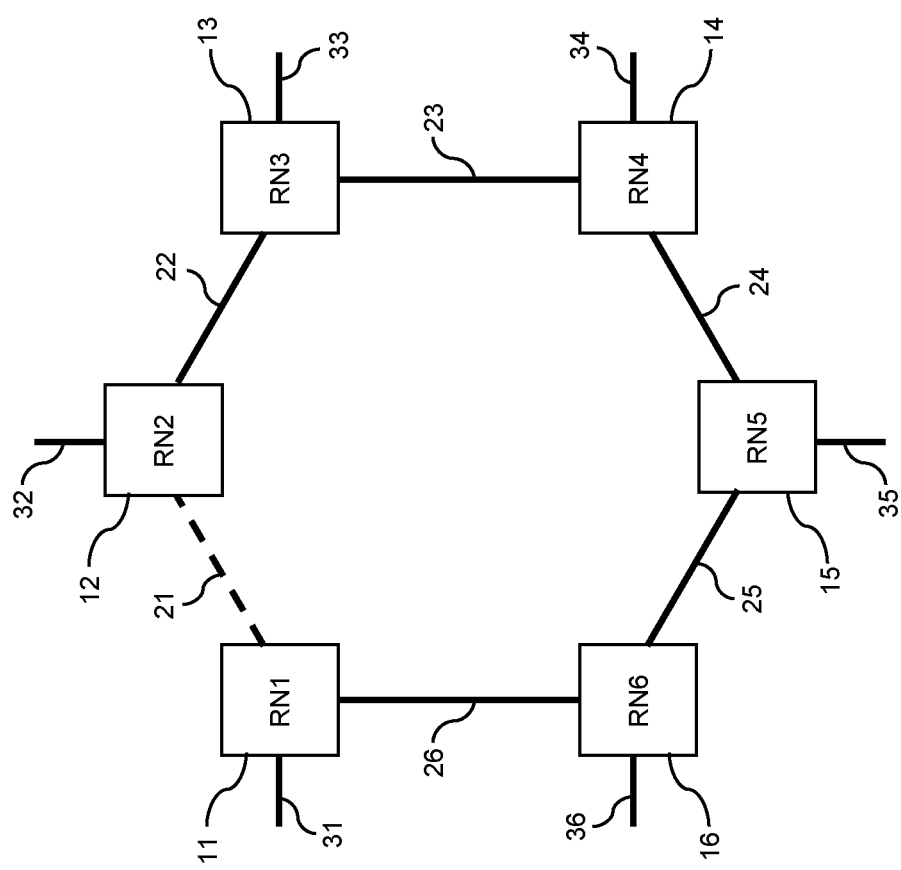
FIG. 1 schematically illustrates an ERP system in which concepts according to an embodiment of the invention may be applied.

An exemplary ERP system is illustrated in FIG. 1. In the illustrated example, the ERP system includes a plurality of RNs 11, 12, 13, 14, 15, 16 forming an Ethernet protection ring by providing links 21, 22, 23, 24, 25, 26 between the RNs 11, 12, 13, 14, 15, 16. For this purpose, each of the RNs 11, 12, 13, 14, 15, 16 is provided with two ring ports for connecting to its adjacent RNs. In addition, each RN 11, 12, 13, 14, 15, 16 may also be provided with additional ports for supporting further links 31, 32, 33, 34, 35, 36 which can be used for communication with other nodes located outside the Ethernet protection ring. In the illustrated example, the number of RNs in the Ethernet protection ring is six. However, other numbers of RNs may be used as well, e.g., two, three, four, five, or more than six RNs. The RNs may for example be part of a Carrier Ethernet network.

In the illustrated example, an RPL is formed by the link 21 between the RN 11 and the RN 12. During normal operation, i.e., as long as there is no failure of a link in the Ethernet protection ring, the RPL formed by the link 21 is blocked or deactivated, thereby avoiding formation of a network loop. In the case of a link failure of one of the links 22, 23, 24, 25, 26, the RPL formed by the link 21 can be unblocked or activated to restore network connectivity between all RNs, however with a changed network topology. Blocking and unblocking of the RPL is controlled by a RN from which the RPL is established, also referred to as RPL owner. In the example of FIG. 1 the RPL owner may be the RN 11 or the RN 12.

In accordance with concepts according to an embodiment of the invention as explained in the following, at least one of the links 21, 22, 23, 24, 25, 26 in the Ethernet protection ring offers the possibility of bandwidth adaptation, and this link is assumed to be the link 25 between the RN 15 and the RN 16. However, it is to be understood that one or more of the other links, or even all links, may offer the possibility of bandwidth adaptation as well, and that the concepts of bandwidth adaptation as explained in the following could also be applied to such other links.

More specifically, the link 25 may be a wireless microwave link or other type of radio link. In this case, bandwidth adaptation of the link 25 may be implemented by adaptation of a modulation scheme and/or of a coding scheme used for transmission of radio signals on the link 25. For example, the bandwidth may be increased by selecting a higher order modulation scheme, and the bandwidth may be decreased by selecting a lower order modulation scheme. Similarly, the bandwidth may be increased by selecting a coding scheme with lower redundancy, and the bandwidth may be decreased by selecting a coding scheme with higher redundancy. Here, it is to be understood that lowering modulation order or increasing redundancy of coding may at the same time increase robustness of signal transmission. Accordingly, the bandwidth adaptation may be used to obtain a tradeoff between robustness and throughput performance of the link 25. In alternative implementations, the link 25 could be implemented as a wire-based link, e.g., using Digital Subscriber Line (DSL) technology, or Passive Optical Network (PON) technology. In such cases, bandwidth adaptation could also be implemented by controlling the aggregation of single physical links to a link bundle supporting the link 25. The other links 21, 22, 23, 24, 26 may be of the same link type, but may also be implemented using link types which are different from that of the link 25.

The bandwidth adaptation may be accomplished in response to transmission conditions on the link, e.g., in terms of signal strength, noise and/or interference level, or availability of transmission resources.

Moreover, the link adaptation mechanism as applied in the illustrated embodiment is configured to deactivate the link under certain conditions, e.g., if a minimum bandwidth requirement cannot be fulfilled. Such conditions will in the following also be referred to as a "critical degradation" of the link 25. In this connection, "deactivating" the link 25 means that transmission of data traffic on the link 25 is stopped entirely. However, certain operations in the RNs 15, 16 adjacent to the link 25 may continue also in case of deactivation of the link 25, e.g., measurements of transmission conditions or the like. In connection with the above ERP functionalities, this causes a failure of the link 25 to be detected and unblocking of the RPL, in the illustrated example link 21. In this way, the data traffic in the network can be rerouted via an alternative path with potentially higher throughput, e.g., via a path which includes the link 21, but not the link 25.

In order to efficiently utilize the possibility of rerouting the data traffic in response to a critical degradation of a link, the decision to deactivate the link 25 is additionally based on a ring protection state of the Ethernet protection ring, i.e., on whether there is a failure of one of the other active links 22, 23, 24, 26 of the Ethernet protection ring or not. The ring protection state may be determined by each RN from messages of the ERP protocol transmitted between the RNs 11, 12, 13, 14, 15, 16. In this way, the risk of isolating one or more RNs from the network by deactivating the link 25 while there is a failure of another link in the Ethernet protection ring can be avoided.

Figure 2:
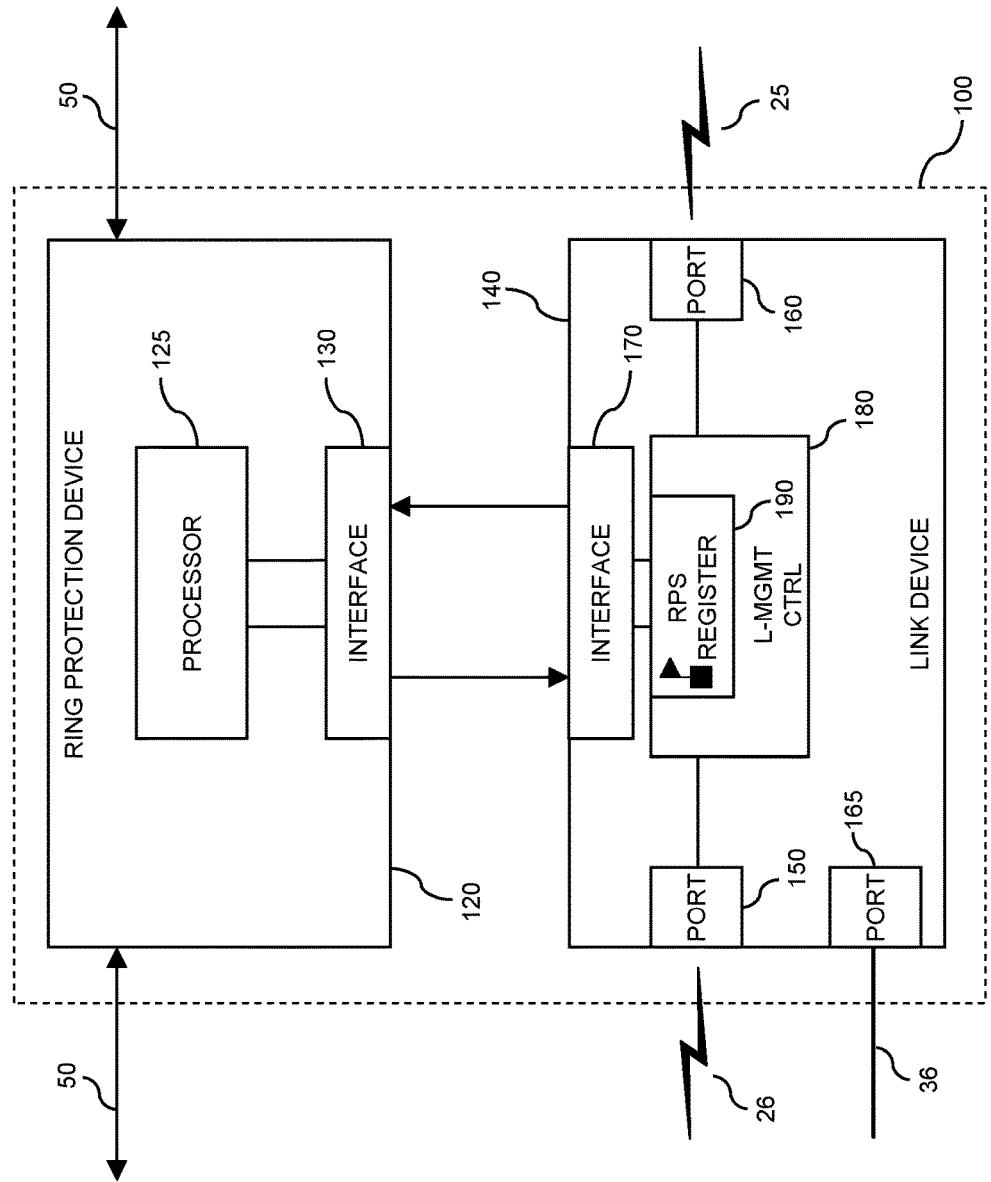
FIG. 2 schematically illustrates structures of a ring node (RN) according to an embodiment of the invention.

FIG. 2 shows structures for implementing the above functionalities in a RN 100. More specifically, it will be assumed that the RN 100 of FIG. 2 corresponds to the RN 16 of FIG. 1. The other RNs may have similar configurations.

As illustrated, the RN 100 is provided with a ring protection device 120 and a link device 140. The ring protection device 120 is configured to control ERP functionalities on the basis of the ERP protocol, e.g., generating and processing messages 50 of the ERP protocol. Such functionalities may also include controlling of blocking and unblocking of an RPL owned by the RN 100. The ERP functionalities may for example be implemented by a processor 125 executing suitably configured program code. By evaluating the messages 50 of the ERP protocol, the ring protection device 120 may determine the ring protection state of the Ethernet protection ring in which the RN 100 is situated. In particular, the ring protection device 120 may become aware of a failure of a link of the Ethernet protection ring. In the examples as illustrated herein, the messages 50 of the ERP protocol are assumed to be R-APS (Ring Automatic Protection Switching) messages as defined in ITU-T G.8032. The messages 50 may include a node identifier indicating a source of the message, e.g., in terms of a MAC (Media Access Control) address of a ring port from which the message is transmitted.

The link device 140 is configured to provide physical ports 150, 160 of the RN 100 to be used for establishing links 25, 26 from the RN 100 to adjacent RNs, i.e., to serve as ring ports of the RN 100. Further, the link device 140 may also provide additional physical ports such as the physical port 165, e.g., for establishing a link to a node outside the Ethernet protection ring. In FIG. 2, the messages 50 of the ERP protocol are shown to be received and sent by the ring protection device 120. However, it is to be understood that this applies to the logical layer of the ERP protocol and that physically the ports 150, 160 of the link device 140 are used for sending and receiving the messages 50 of the ERP protocol.

In FIG. 2, the ports 150, 160 are illustrated as radio ports, e.g., to provide the links 25, 26 in the form of microwave links. As mentioned above, other types of ports could be used as well, e.g., wire-based ports using DSL or PON technology.

As further illustrated, the link device 140 is provided with a link management controller (L-MGMT CTRL) 180. The link management controller 180 is configured to perform bandwidth adaptation of the link 25 and/or of the link 26 established from the RN 100 to adjacent RNs. This bandwidth adaptation may be accomplished by adaptation of a modulation scheme and/or of a coding scheme. In addition or as an alternative, this bandwidth adaptation may also be accomplished by controlling aggregation of multiple links to a link bundle. The bandwidth adaptation may be based on transmission conditions on the respective link, e.g., on signal strength, noise and/or interference level, or availability of transmission resources.

As mentioned above, the link management controller 180 may also decide to deactivate one of the links 25, 26 depending on the adapted bandwidth, e.g., if the adapted bandwidth is below a threshold value. This decision is additionally based on the ring protection state of the Ethernet protection state. In the illustrated example, the link management controller 180 receives information concerning the ring protection state from the ring protection device 120. For this purpose, the ring protection device 120 is provided with an interface 130 towards the link device 140, and the link device 140 is provided with an interface 170 towards the ring protection device 120. Further, the link management controller 180 may also be provided with a ring protection state register (RPSR) 190 for storing the ring protection state as determined by the ring protection device 120. Using the interfaces 130, 170, the ring protection device 120 may notify the link device 140 of the ring protection state, e.g., by sending a first message from the ring protection device 120 to the link device 140. Further, in case of deactivation of one of the links 25, 26 by the link management controller 180, the link management controller 180 may notify the ring protection device 120 of the reason for deactivation of the link 25, 26, e.g., by sending a second message from the link device 140 to the ring protection device 120. The reason for deactivation may for example distinguish between deactivation due to insufficient bandwidth and deactivation due to link failure.

The implementation of the interfaces 130, 170 between the ring protection device 120 and the link device 140 may vary depending on the implementation of the ring protection device 120 and the link device 140 in the RN 100. In some implementations, the ring protection device 120 may be implemented as a device which is physically separated from the link device 140. This may allow for a modular implementation of the RN 100 which can be flexibly adapted to various types of links or ERP protocols. In this case, the interfaces 130, 170 may correspond to suitable physical interfaces. In other implementations, the ring protection device 120 and the link device 140 may be integrated as in the same device, e.g., by providing the ring protection device 120 as functional component of the RN 100. In the latter case, the interfaces 130, 170 can be implemented as interworking functions to allow internal exchange of information within the device, e.g., by exchanging information between a software process implementing the ERP functionalities and a software process implementing functionalities of the link management controller 180.

In the following, exemplary operating scenarios of the ERP system as explained above will be described with reference to FIGS. 3 to 8. These scenarios are based on the Ethernet protection ring as illustrated in FIG. 1, in which the RPL is formed by the link 21 and bandwidth adaptation according to the above principles can be applied at least with respect to the link 25. Each of the RNs 11, 12, 13, 14, 15, 16 may have a configuration as explained in connection with FIG. 2.

Figure 3:
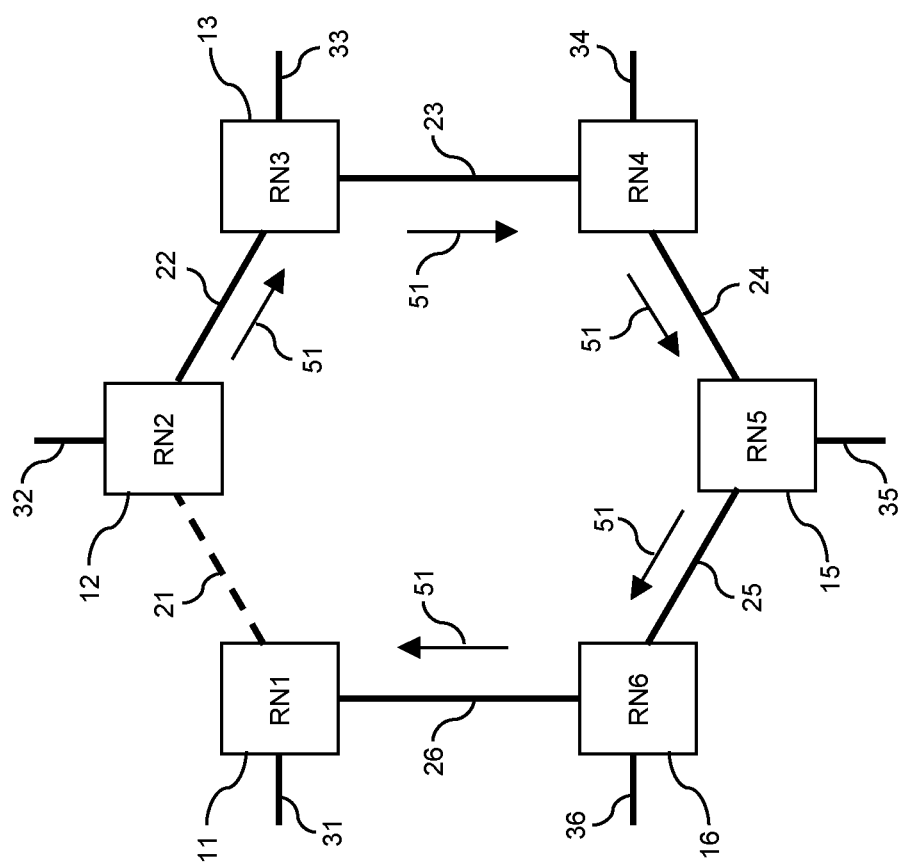
FIG. 3 illustrates a first operating scenario of an ERP system according to an embodiment of the invention.

FIG. 3 shows an operating scenario corresponding to normal operation of the ERP system, i.e., with no failure of the links 22, 23, 24, 25, 26. In this case, the RPL formed by the link 21 is blocked, as illustrated by the dashed line. The links 22, 23, 24, 25, 26 being operational is indicated from one RN 11, 12, 13, 14, 15, 16 to the other by sending corresponding messages 51 of the ERP protocol to adjacent RNs, e.g., R-APS messages of the No Request (NR) type. In this way, all RNs 11, 12, 13, 14, 15, 16 are informed that there is no link failure and the RPL formed by the link 21 could be unblocked if necessary. In the RN 16 or other RNs 11, 12, 13, 14, 16 having the configuration as illustrated in FIG. 2, the ring protection state, i.e., that there is no link failure in the Ethernet protection ring, may be stored in the ring protection state register 190.

Figure 4:
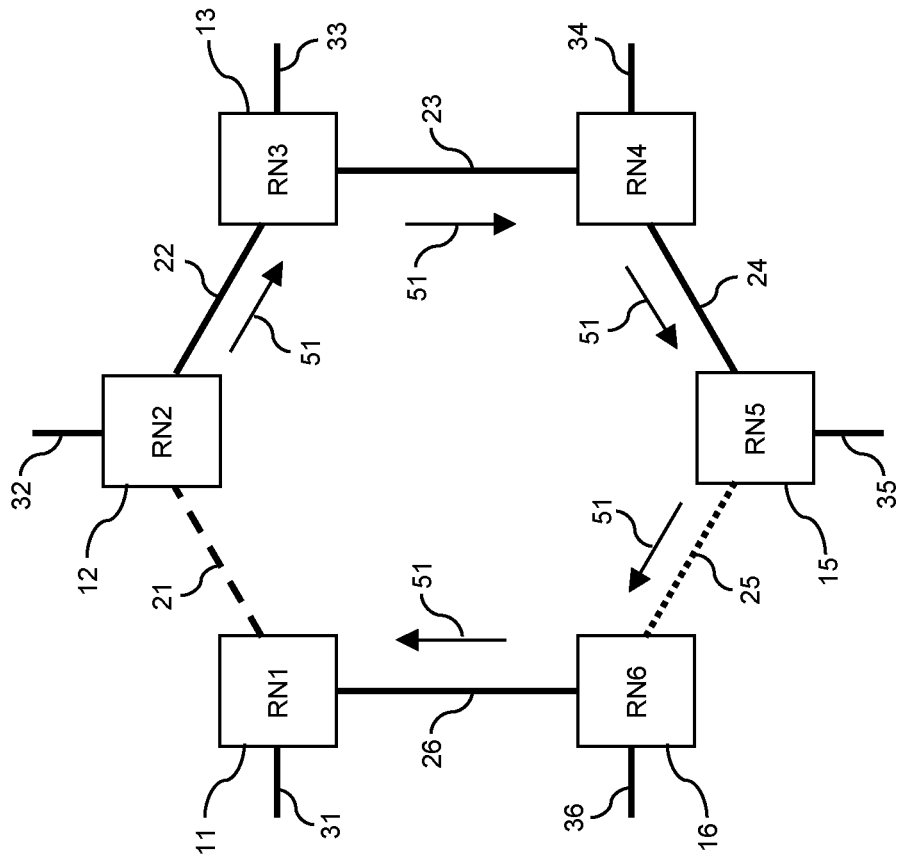
FIG. 4 illustrates a second operating scenario of an ERP system according to an embodiment of the invention.

FIG. 4 shows an operating scenario in which a critical degradation of the link 25 occurs, illustrated by a dotted line, resulting in an adapted bandwidth below the threshold value. The links 22, 23, 24, 26 are operational, as indicated by the messages 51 of the ERP protocol. In this case, since the ring protection state indicates no link failure, the link 25 can be deactivated. In the illustrated example, the deactivation of the link 25 is assumed to be accomplished by the RN 16, e.g., by the link management controller 180 of the link device 140 in the RN 16. In particular, the link management controller 180 in the RN 16 may deactivate the link 25 in response to the adapted bandwidth being below the threshold value and the ring protection state indicating no link failure in the Ethernet protection ring.

Figure 5:
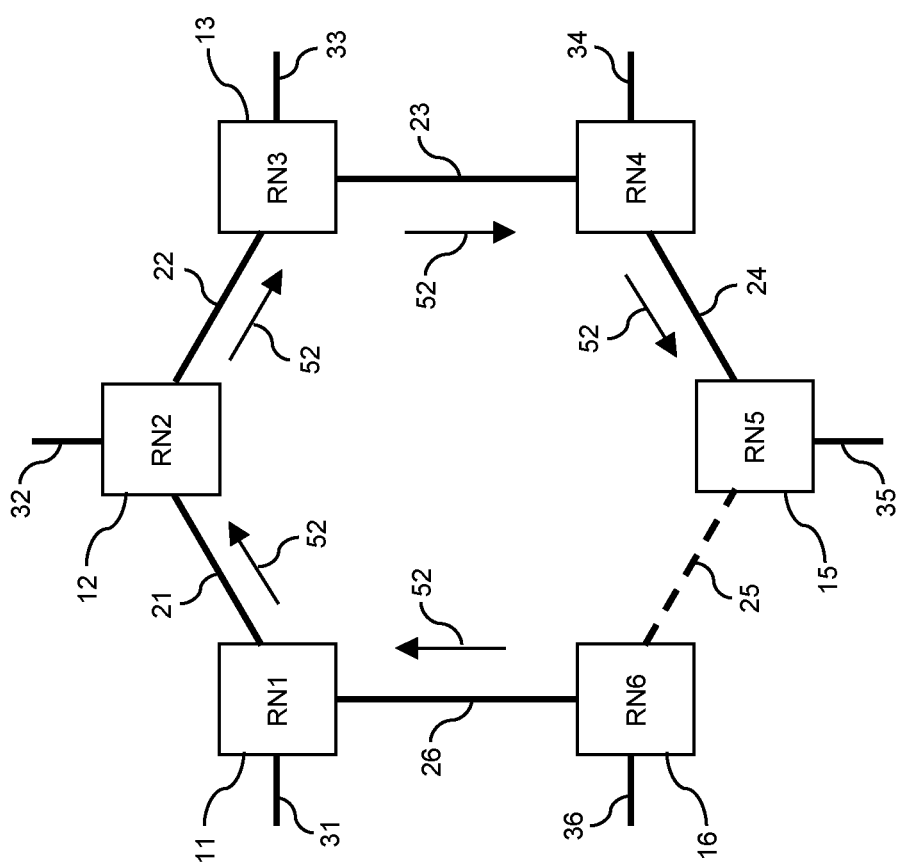
FIG. 5 illustrates a third operating scenario of an ERP system according to an embodiment of the invention.

The deactivation of the link 25 results in an operating scenario as illustrated in FIG. 5, in which the link 25 is deactivated, indicated by a dashed line, and the RN 16 sends a message 52 of the ERP protocol to indicate a failure of the link 25, e.g., an R-APS message of the Signal Failure (SF) type. The RN 16 may send the message 52 in response to its ring protection device 120 being informed of the link 25 being deactivated due to insufficient bandwidth, e.g., as notified by the link management controller 180 of the link device 140. Alternatively, the ring protection device 120 could otherwise determine that the link 25 is not operational, e.g., from a lack of ERP protocol messages received from this link. By sending corresponding messages 52 of the ERP protocol to adjacent RNs, the other RNs 11, 12, 13, 16 are informed of the link failure as well, resulting in unblocking of the RPL formed by the link 21, illustrated by a solid line. Accordingly, none of the RNs 11, 12, 13, 14, 15, 16 is isolated from the network.

Figure 6:
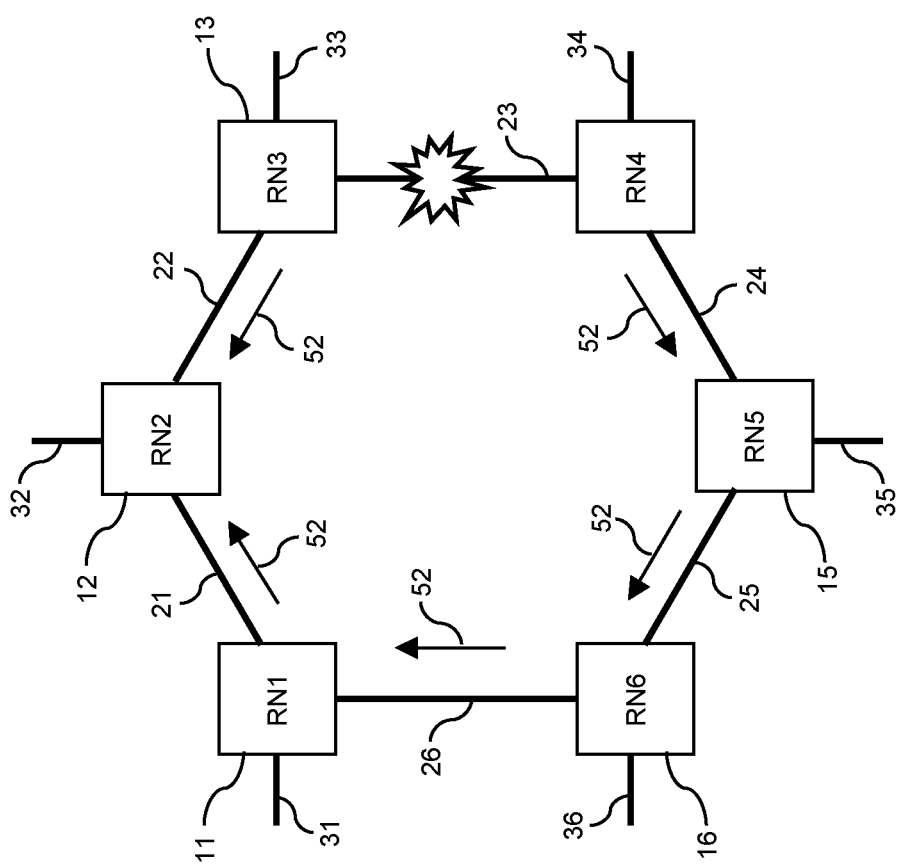
FIG. 6 illustrates a fourth operating scenario of an ERP system according to an embodiment of the invention.

FIG. 6 illustrates a further operating scenario in which there is a link failure of the link 23, e.g., due to antenna damage of the RN 13 or the RN 14. The RNs 13, 14 inform their adjacent RNs 12, 15 of the link failure by sending messages 52 of the ERP protocol to indicate the link failure, e.g., R-APS messages of the SF-type. By sending corresponding messages 52 to adjacent RNs, the other RNs 11, 12, 16 are informed of the link failure as well, resulting in unblocking of the RPL formed by the link 21, illustrated by a solid line. In the RN 16 or other RNs 11, 12, 13, 14, 16 having the configuration as illustrated in FIG. 2, the ring protection state, i.e., that there is a link failure in the Ethernet protection ring, may be stored in the ring protection state register 190.

Figure 7:
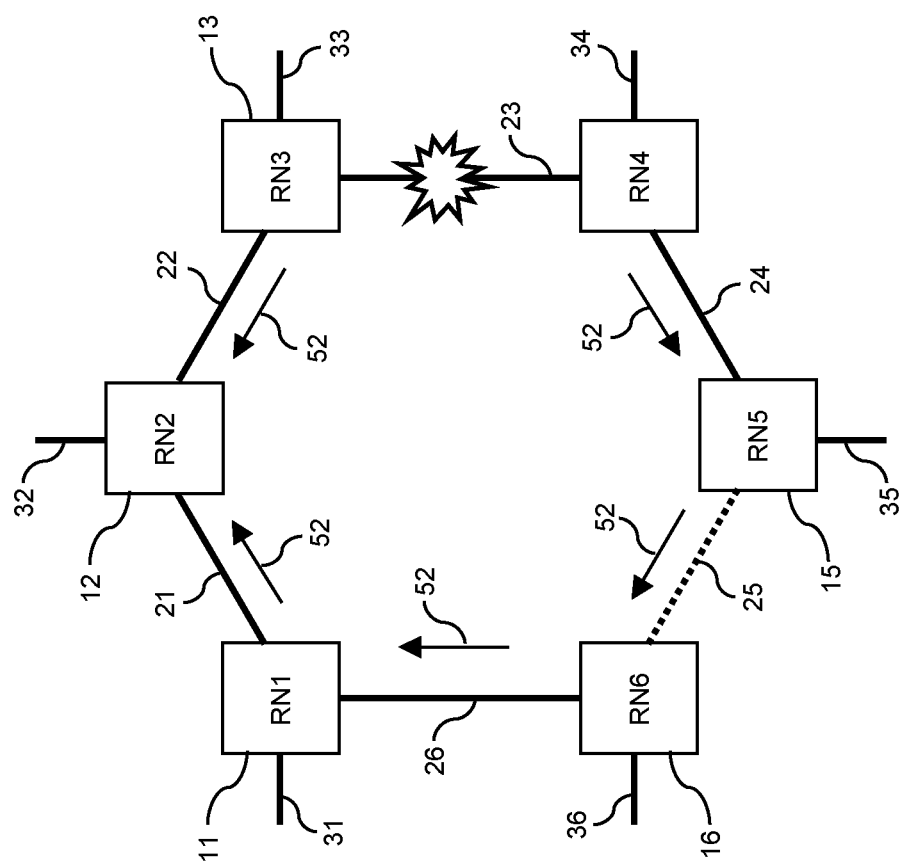
FIG. 7 illustrates a fifth operating scenario of an ERP system according to an embodiment of the invention.

FIG. 7 illustrates a further operating scenario in which a critical degradation of the link 25 occurs in the configuration of FIG. 6, illustrated by a dotted line, resulting in an adapted bandwidth below the threshold value. In this case, irrespective of the adapted bandwidth being below the threshold value, the link 25 is not deactivated because the ring protection state indicates a link failure. That is to say, due to the link failure the link management controller 180 in the RN 16 prohibits deactivation of the link 25, and the link 25 is kept operational at the adapted bandwidth below the threshold value.

Figure 8:
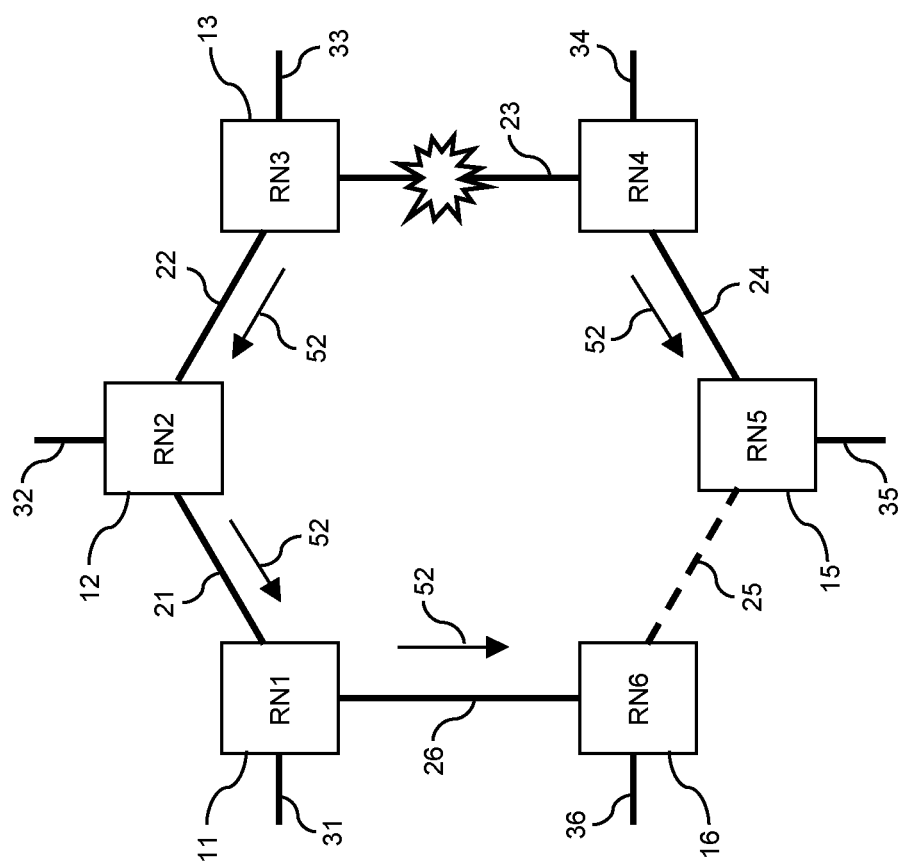
FIG. 8 illustrates a sixth operating scenario of an ERP system according to an embodiment of the invention.

The operating scenario of FIG. 7 may also be reached when a failure of the link 23 occurs in the configuration of FIG. 5, as illustrated in FIG. 8, and the RN 16 reactivates the link 25 in response to being informed of the link failure by a message 52 of the ERP protocol indicating the link failure. As illustrated, when receiving the message 52 while link 25 is still deactivated due to insufficient bandwidth, the RN 16 may react by reactivating the link 25. The RN 15 at the other end of the deactivated link 25 may perform similar operations. Having reactivated the link 25, transmission of data traffic on the link 25 is allowed irrespective of the adapted bandwidth of the link 25 being below the threshold value, thereby reaching an operating scenario which is similar to that of FIG. 7.

Figure 9:
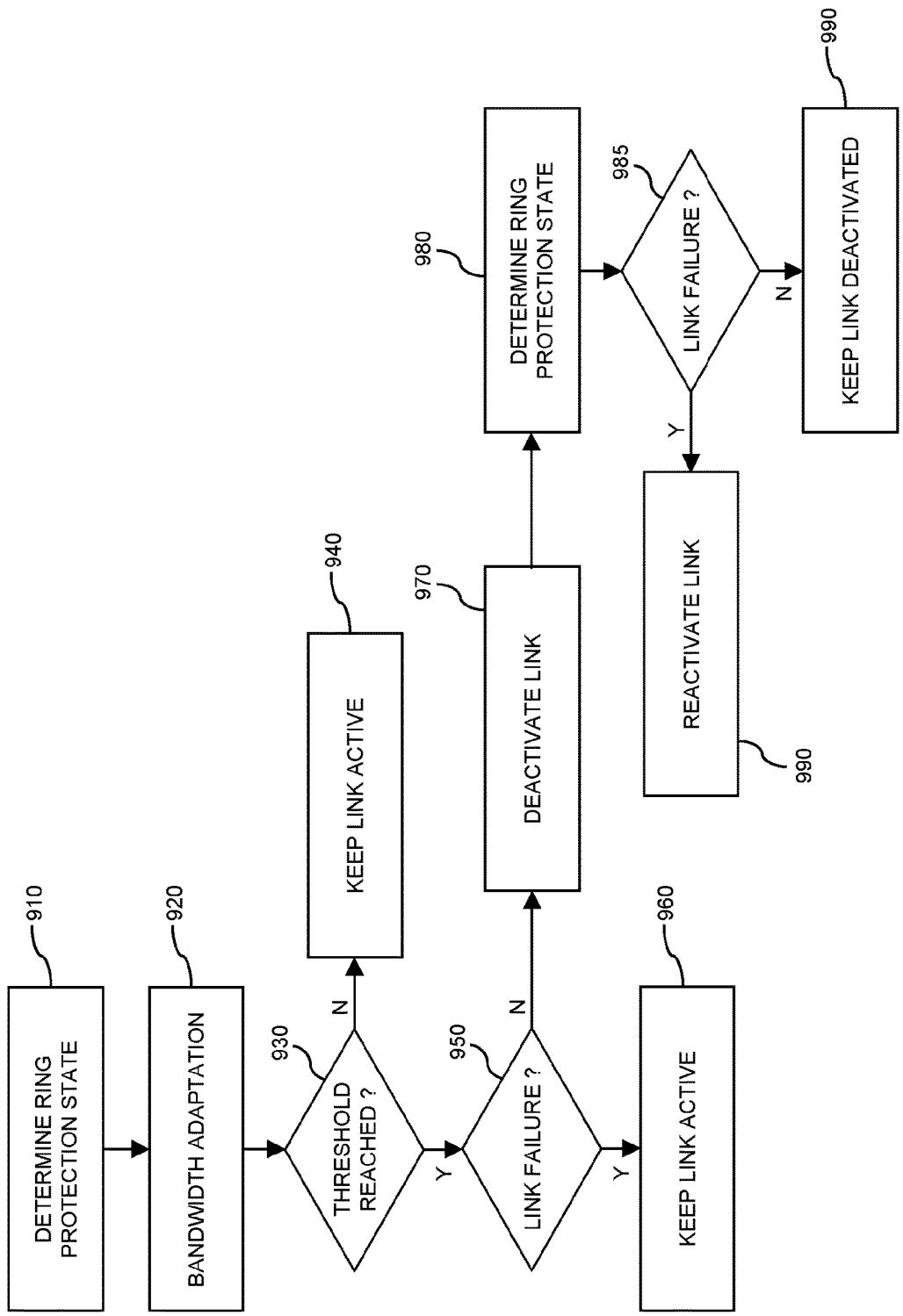
FIG. 9 shows a flowchart for schematically illustrating a method according to an embodiment of the invention.

FIG. 9 shows a flowchart for schematically illustrating a method which may be used to implement the above concepts of adapting the bandwidth of a link of an Ethernet protection ring. The method may be implemented in a RN of the Ethernet protection ring, e.g., as illustrated in FIGS. 1 to 8. The method may be implemented in connection with an ERP mechanism, e.g., according to ITU-T G.8032 or using the STP, MSTP, or RSTP.

At step 910 a link management controller, e.g., the link management controller 180 of FIG. 2, determines a ring protection state of the Ethernet protection ring. The ring protection state indicates whether there is a link failure in the Ethernet protection ring or not. For example, a RN of the Ethernet protection ring, in particular a ring protection device of the RN, such as the ring protection device 120 of FIG. 2, may determine the ring protection state from a received message of an ERP protocol, e.g., according to ITU-T G.8032, STP, MSTP, or RSTP and indicate the ring protection state to its link management controller. The ring protection state may be stored by the link management controller, e.g., in a corresponding register such as the ring protection state register 190 of FIG. 2.

At step 920 the link management controller adapts the bandwidth of a link of the Ethernet protection ring. This may for example be accomplished by adapting a modulation scheme and/or a coding scheme of the link. In addition or as an alternative, this may also be accomplished by controlling aggregation of links to a link bundle. The link may be implemented as a wireless link, in particular as a microwave link. Alternatively, the link may be implemented as a wire-based link, e.g., using DSL technology or PON technology. The detailed mechanism used for implementing the bandwidth adaptation may be selected depending on the particular implementation of the link.

At step 930, the link management controller performs a first decision on the basis of the adapted bandwidth. In particular, the link management controller may determine whether the adapted bandwidth is below a threshold value, e.g., below a configured minimum bandwidth requirement. If this is the not the case, as indicated by branch "N", the method continues with step 940 in which the link is kept active, i.e., operation of the link is continued with the adapted bandwidth. If the determination of step 930 indicates that the adapted bandwidth is below a threshold value, as indicated by branch "Y", the method continues with step 950. The decision of step 940 may be performed before or after the adapted bandwidth is actually applied to the link.

At step 950, the link management controller performs a second decision on the basis of the link protection state. In particular, the link management controller may decide, on the basis of the link protection state, whether there is a link failure in the Ethernet protection ring or not. If this is the case, as indicated by branch "Y", the method continues with step 960 in which the link is kept active, i.e., operation of the link is continued with the adapted bandwidth. If the determination of step 950 indicates that there is a link failure in the Ethernet protection ring, the method continues with step 970, in which the link subjected to bandwidth adaptation is deactivated. The deactivation may for example involve blocking of data traffic on the link and may further also involve shutting down receiver and/or transmitter functionalities associated with the link.

As can be seen, steps 930, 940, 950, 960, and 970 involve the link management controller deactivating of the link depending on both the adapted bandwidth and the determined Ethernet ring protection state. In particular, the link management controller may deactivate the link if the adapted bandwidth of the link is below a threshold value and the ring protection state indicates no link failure in the Ethernet protection ring.

At step 980, the link management controller may perform a further determination of the ring protection state, which may be accomplished in a similar manner as in step 910. This further determination may be used by the link management controller to decide whether the link, which was deactivated due to insufficient bandwidth, should be reactivated.

At step 985, the link management controller may perform a further decision on the basis of the ring protection state. In particular, may decide, on the basis of the link protection state, whether there is a link failure in the Ethernet protection ring or not. If this is the case, as indicated by branch "Y", the method continues with step 990 in which the deactivated link is kept deactivated.

If the determination of step 985 indicates that there is a link failure in the Ethernet protection ring, the method continues with step 995, in which the deactivated link is reactivated. This may in particular involve resuming transmission of data traffic on the link, irrespective of the adapted bandwidth of the link being below the threshold value.

As can be seen, steps 980, 985, 990, and 995 may optionally be used for reactivating a link which was deactivated due to the adapted bandwidth being below the threshold value, if the ring protection state indicates a link failure in the Ethernet protection ring.

In some scenarios, the link management controller may be provided in a link device, e.g., the link device 140 of FIG. 2 which provides the link to be subjected to bandwidth adaptation, and the ring protection device implementing ERP functionalities may be provided separately from the link device. In such cases, the link device may receive a first message indicating the ring protection state from the ring protection device, and the link management controller may determine the ring protection state from the received first message. In such cases, the link device may also send a second message to the ring protection device to indicate deactivation of the link and a reason for deactivation of the link, e.g., deactivation due to insufficient bandwidth as accomplished at step 970 or deactivation due to link failure. The ring protection device may then adapt its operation accordingly.

Accordingly, concepts as explained above may be used for efficiently performing bandwidth adaptation of a link in an Ethernet protection ring. For example, a link suffering from a critical degradation may be deactivated without isolating RNs from the network and risking network outages, thereby supporting high availability requirements. Further, overall throughput in the network can be improved by deactivation of degraded links and switching to another network topology offering paths with higher throughput, e.g., if the RPL offers higher throughput than the degraded link. Moreover, the concepts may be implemented without requiring changes of the underlying ERP protocol.

It is to be understood that the examples and embodiments as explained above are merely illustrative and susceptible to various modifications. For example, the concepts could be applied using other types of ring protection protocols or even be based on a combination of different Ethernet ring protection protocols. Further, various link types or combinations of different link types may be used in the Ethernet protection ring and be subjected to bandwidth adaptation. Details of the link adaptation mechanisms may be appropriately selected depending on the link type, e.g., adaptation of modulation scheme, adaptation of coding scheme, adaptation of link aggregation bundles, or the like. Also, the concepts may be applied in various types of network topologies, e.g., including multiple Ethernet protection rings with corresponding RPLs. Further, it is to be understood that the above concepts may be implemented by using correspondingly designed software to be executed by a processor of an existing device or by using dedicated device hardware.

The invention claimed is:

1. A method for link adaptation in an Ethernet ring protection system, the method comprising:
   a link management controller obtaining a ring protection state parameter indicating a ring protection state of an Ethernet protection ring;
   the link management controller adapting bandwidth of a link of the Ethernet protection ring;
   the link management controller determining whether the adapted bandwidth is below a threshold;
   the link management controller determining whether the ring protection state parameter indicates no link failure in the Ethernet protection ring; and
   the link management controller deactivating the link of the Ethernet protection ring
   in response to determining that the adapted bandwidth is below the threshold and the ring protection state parameter indicates no link failure in the Ethernet protection ring.

2. The method according to claim 1, wherein the link management controller reactivates the link if the adapted bandwidth is below a threshold and the ring protection state parameter indicates a link failure in the Ethernet protection ring.

3. The method according to claim 1, wherein said adapting of the bandwidth comprises adapting a modulation scheme and/or a coding scheme of the link.

4. The method according to claim 1, wherein the link is implemented as a wireless link.

5. The method according to claim 1, wherein
   the link management controller is located in a link device providing the link;
   the link device is coupled to a ring protection device operating on the basis of an Ethernet ring protection protocol;
   the link device receives a first message indicating the ring protection state from the ring protection device; and
   the link management controller determines the ring protection state on the basis of the first message received from the ring protection device.

6. The method of claim 1, wherein the adapting bandwidth of a link of the Ethernet protection ring is accomplished in response to one or more transmission conditions on the link, the transmission conditions comprising signal strength, noise, interference, and availability of transmission resources.

7. The method of claim 1, wherein the ring protections state parameter indicates one of a failure or no failure of one or more active links of the Ethernet protection ring.

8. The method of claim 1, wherein the link management controller is further configured to transmit a message comprising a notification of the deactivation of the link.

9. The method according to claim 4, wherein the link is implemented as a microwave link.

10. The method according to claim 5, comprising:
    in response to deactivation of the link by the link management controller, the link device sending a second message to the ring protection device to indicate a reason for deactivation of the link.

11. A device for an Ethernet ring protection system, the device comprising:
    at least one port for providing a link of an Ethernet protection ring; and
    a link management controller configured to:
    obtain a ring protection state parameter indicating a ring protection state of the Ethernet protection ring;
    adapt bandwidth of the link;
    determine whether the adapted bandwidth is below a threshold;
    determine whether the ring protection state parameter indicates no link failure in the Ethernet protection ring; and
    deactivate the link of the Ethernet protection rink in response to determining that the adapted bandwidth is below the threshold and the ring protection state parameter indicates no link failure in the Ethernet protection ring.

12. The device according to claim 11, comprising:
    a ring protection device operating on the basis of an Ethernet ring protection protocol, and
    wherein the ring protection device is configured to determine the ring protection state from a received message of the Ethernet ring protection protocol and to indicate the determined ring protection state to the link management controller.

13. The device according to claim 11, comprising:
    an interface for coupling to a ring protection device operating on the basis of an Ethernet ring protection protocol;
    wherein the link management controller is configured to determine the ring protection state from a first message received via said interface from the ring protection device.

14. The device according to claim 11, wherein the link management controller is configured to reactivate the link if the adapted bandwidth is below a threshold and the ring protection state parameter indicates a link failure in the Ethernet protection ring.

15. The device according to claim 11, wherein the link management controller is configured to adapt the bandwidth by adapting a modulation scheme and/or a coding scheme of the link.

16. The device according to claim 11, wherein the link is implemented as a wireless link.

17. The device according to claim 11, wherein the link is implemented as a microwave link.

18. The device according to claim 12, wherein the link management controller is configured to indicate a reason for deactivation of the link by the link management controller to the ring protection device.

19. The device according to claim 13, wherein the link management controller is configured to send a second message via said interface to the ring protection device, said second message indicating a reason for deactivation of the link by the link management controller.

\* \* \* \* \*